Nov. 1, 1927.
D. A. LOCKWOOD
CHECK VALVE
Filed July 14, 1926
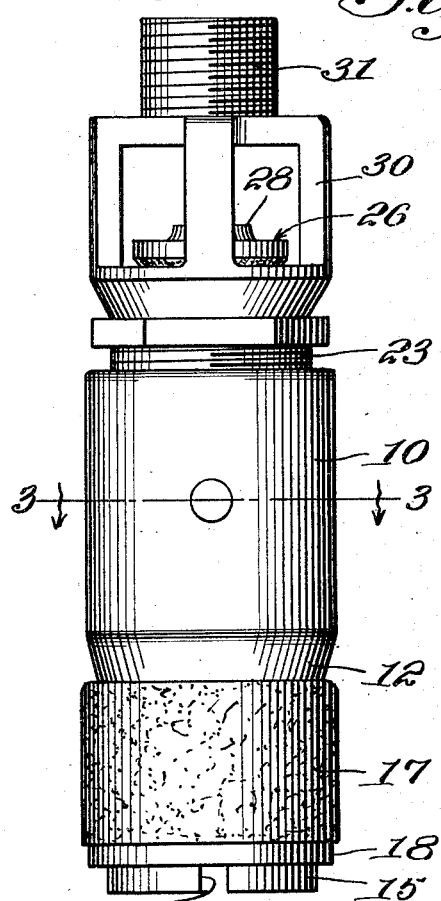
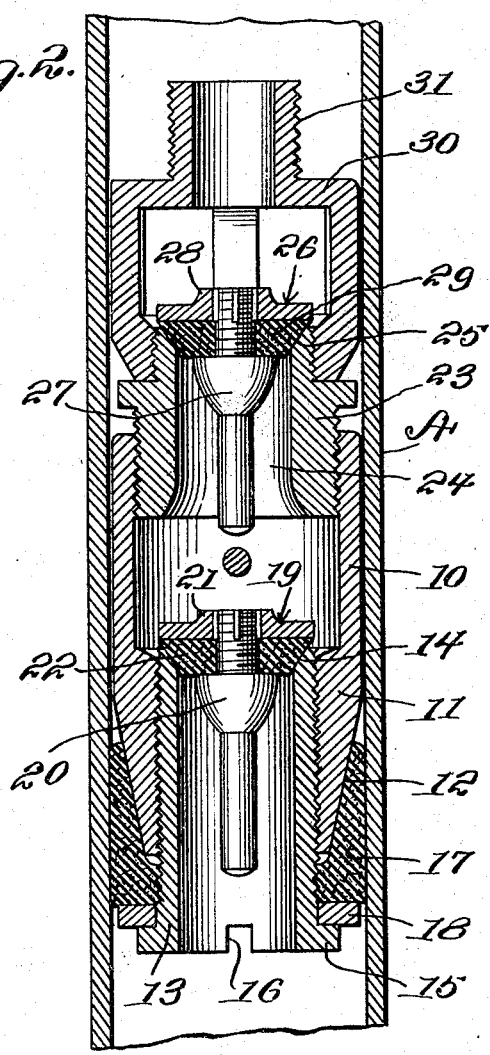
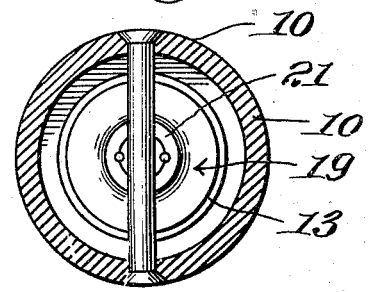
Dudley A. Lockwood INVENTOR
BY Victor J. Evans ATTORNEY
WITNESS: J. L. Wright Patented Nov. 1, 1927.

1,647,873

UNITED STATES PATENT OFFICE.

DUDLEY A. LOCKWOOD, OF RAGAN, NEBRASKA.

CHECK VALVE.

Application filed July 14, 1926. Serial No. 122,424.

This invention relates to check valves used in connection with deep tubular wells and has for its object the provision of a simple novel double check valve which is bound to be more efficient than the ordinary type inasmuch as the holding action will be doubled instead of reliance being placed upon a single valve as is the case in the ordinary construction.

An important object of the invention is to provide a double check valve of this type which is, nevertheless, provided with only a single expansion rubber and which will consequently be as easy to pull as the ordinary variety in case occasion arises.

An additional object is to provide a device of this character which will be only slightly longer than the ordinary type and which embodies only a few additional parts, the structure being therefore simple and inexpensive to make, easy to assemble or disassemble, in addition to being positive in action, efficient and durable in service, and a general improvement in the art.

With the above and other objects and advantages in view, the invention consists in the details of construction, and the arrangement and combination of elements to be hereinafter more fully described and claimed, and illustrated in the accompanying drawings, in which:—

Figure 1 is a side elevation of the complete device.

Figure 2 is a central vertical or longitudinal section therethrough, and

Figure 3 is a detail cross section taken on the line 3—3 of Figure 1.

Referring more particularly to the drawings, the letter A designates a tubular well casing within which is located the double check valve which constitutes the subject matter of the invention and is of the standing type. This valve structure comprises a shell-like body member 10 which has one end formed with a threaded bore 11 and an exterior tapered surface 12. Screwed into the bore 11 is a sleeve member 13 terminating at its upper end in a valve seat 14 and provided at its lower end with an outstanding flange 15 and a notch 16 for engagement therein of a spanner wrench or the like for effecting the necessary turning movement during assembling or disassembling. Engaged upon the tapered portion 12 at the lower end of the body member is an expansible packing gasket 17 to make a tight fit, this gasket being engaged by a washer 18, in turn engaged by the outstanding flange 15 at the lower end of the sleeve member 13 so that when the sleeve member is screwed firmly into place, the gasket 17 will be forced outwardly into close frictional engagement with the wall of the tube A.

Mounted upon the member 13 is a lower check valve 19 which includes a stem 20 and a nut like head member 21 thereon compressingly engaging a gasket or washer 22 which coacts with the seat 14.

Screwed into the upper end of the body member or shell 10 is the upper coupling member 23 provided with a bore 24 and a valve seat 25 which cooperates with the upper check valve 26 which may be formed with a stem 27 and a head 28 threadedly secured thereto and compressingly engaging against a washer or packing member 29 which coacts with the seat 25.

In turn screwed upon the externally threaded upper end of the coupling member 23 is a cage 30 terminating in a threaded reduced extension 31 with which connects any suitable piping, not shown.

In the operation, it will of course be apparent that the device is placed down inside of the well tubing in the same manner. Each check valve acts in exactly the same manner as other standing valves as an ordinary check valve but there is the great advantage that two are provided so that in case of any obstruction getting under one and interfering with its operation there is still one left which can perform its functions. Obviously, the device will not need to be drawn from a well with anywhere near as much frequency as the ordinary variety as repairs will be needed less often. Furthermore, even if the upper valve should become worn, as it is bound to in the course of time, it is apparent that there is still a good deal of the load relieved from the lower valve so that leakage is less likely to happen. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a check valve structure of the character described, an intermediate body member provided at its lower end with a threaded bore and a tapered exterior, an expansion gasket engaged upon said tapered exterior, a sleeve member screwed into said bore, an outstanding flange formed on the lower end of said sleeve, a washer between said flange and gasket and compressingly engaging the latter, a valve seat formed on the upper end of said sleeve, a coupling member screwed into the upper end of the body and formed at its upper end with a valve seat, a cage screwed upon the upper end of the coupling member, and a check valve cooperating with each seat, each check valve comprising a downwardly extending stem, a head threaded thereon, and a compressible washer between the heads and stems.

In testimony whereof I affix my signature.

DUDLEY A. LOCKWOOD.